(12) United States Patent
Kalocsai (10) Patent No.: US 8,677,139 B1
(45) Date of Patent: Mar. 18, 2014

(54) METHOD TO PROVIDE AUTHENTICATION USING A UNIVERSAL IDENTIFIER

(75) Inventor: Peter Kalocsai, Clovis, CA (US)

(73) Assignee: Peter Kalocsai, Clovis, CA (US)

( * ) Notice: Subject to any disclaimer, the term of this patent is extended or adjusted under 35 U.S.C. 154(b) by 1234 days.

(21) Appl. No.: 12/354,791

(22) Filed: Jan. 16, 2009

Related U.S. Application Data (60) Provisional application No. 61/021,347, filed on Jan. 16, 2008.

(51) Int. Cl.
*G06F 21/00* (2013.01)
*H04L 9/32* (2006.01)
*G06F 7/04* (2006.01)
*G06K 9/00* (2006.01)

(52) U.S. Cl.
USPC ............... 713/186; 713/168; 713/170; 726/5; 382/115

(58) Field of Classification Search
USPC ............ 726/7, 5; 713/168, 170, 186; 382/115
See application file for complete search history.

(56) References Cited

U.S. PATENT DOCUMENTS

| | | | |
|---|---|---|---|
| 2003/0177356 A1* | 9/2003 | Abela | 713/168 |
| 2008/0033740 A1* | 2/2008 | Cahn et al. | 705/1 |
| 2008/0095410 A1* | 4/2008 | Shalev et al. | 382/115 |

* cited by examiner

*Primary Examiner* — Aravind Moorthy (57) ABSTRACT

Once an individual is issued a Universal Identifier (UID) it uniquely identifies that person anywhere in the world. The UID could be embedded in any type of device, token or apparatus that is capable of transmitting it (only several bytes of data) to a reader device. Alternatively, for the purposes of authentication the UID could also be entered via a keypad or via any other means. The code scheme for a UID could be any type of symbol sequence that is capable of providing enough combination to cover the entire expected human population. Although it can also be used without biometric data the intended use of the UID is in conjunction with biometric authentication. The Universal Identifier is universal from two aspects: first it is a global or worldwide identifier for people around the world; second it is to be used most generally in any type of transactions, processes or scenarios where authentication is needed. UIDs are issued by an Identity Clearinghouse (IC) or Universal Authentication Authority (UAA) or a Centralized Identity Management Service (CIMS) after verifying the uniqueness of submitted biometric and personal data.

19 Claims, 8 Drawing Sheets

| Universal Identifier Symbol Sequence Scheme | Example |
|---|---|
| ISO 8601 birth date + choice of 8 letters | 20031014 KATIEKAL |
| ISO 8601 birth date + choice of 7 letters + check char. | 20031014 KATIEKAZ |
| ISO 8601 birth date + choice of 1 to 8 letters | 20031014 K |
| ISO 8601 birth date + choice of 0 to 7 letters + check char. | 20031014 KAB |
| ISO 8601 birth date + choice of 4 letters | 20031014 KATI |
| ISO 8601 birth date + ISO 3166 birth place country code + choice of 5 letters | 20031014 USAKATIE |
| Short birth date + choice of 6 letters | 031014 KATIEK |
| US type birth date + choice of 6 letters | 101403 KATIEK |
| Sequence of 7 random numerals and letters | H3DI7G9 |
| Sequence of 8 letters (4+4) | KATI KALO |
| Sequence of 10 numerals (5+5) | 43728 56743 |

FIG. 8

METHOD TO PROVIDE AUTHENTICATION USING A UNIVERSAL IDENTIFIER

CROSS-REFERENCE TO RELATED APPLICATIONS

This application claims priority under 35 U.S.C. §119(e)(1) and 37 C.F.R. §1.78(a)(4) to U.S. provisional application Ser. No. 61/021,347 filed Jan. 16, 2008 and titled METHOD TO PROVIDE AUTHENTICATION USING A UNIVERSAL IDENTIFIER.

FEDERALLY SPONSORED RESEARCH

Not applicable

SEQUENCE LISTING OR PROGRAM

Not applicable

FIELD OF THE INVENTION

Embodiments of the present invention relate generally to the field of authentication. More precisely, embodiments of the present invention relate to biometric(s) based authentication with the help of a Universal Identifier which is associated with the biometric data of the user.

BACKGROUND OF THE INVENTION

Authentication is the process of establishing confidence in user identities. In other words it is the process of determining whether someone is in fact who he/she claims to be. It is well accepted that one of the strongest ways of authentication is that of the biometrics based one. As opposed to utilizing something the user has or knows biometric based authentication is directly based on something the user is.

The usage of identifiers (typically identification numbers) in various authentication scenarios is well known in the prior art. Many countries issue national ID cards to its citizens with an identification number linked either to the card or to the person itself. Most countries passport's also have an identifying character set (in many cases a passport number) linking the passport to its owner. Most nations' driver licenses are also equipped with an identifying sequence of characters, typically referred to as the driver license number. Although it might be called a number in many cases both the passport and driver license number can contain a mixture of letters and numerals. In the United States the Social Security Number has become a de facto national identification number. Notice, however, that none of these above identifiers or identification numbers had approached anything close to a global reach. Their jurisdiction is limited to a country or some other geographically limited region. The present invention proposes a global or universal identifier where each person in the world would have one globally unique identifier. As opposed to national identity cards, passports, driver licenses and the Social Security Number, this identifier would not have to be printed or issued on any type of card or other document. This is because this identifier is specifically to be used with biometric authentication. In this type of authentication the biometric trait proves identity and not the possession of some token such as an ID card. For ease of use, however, the Universal Identifier could be embedded in various personal electronic devices so that a reader device could automatically and instantly collect a user's identifier at time of authentication.

There are many kinds of Universal Identifiers know in the prior art. These types of identifiers are used for uniquely referencing a wide variety of objects such as people (SSN), products (UPC), companies and organizations (CAGE code, DUNS), software (UUID, GUID), books (ISBN), periodical publications (ISSN), printed music items (ISMN), network adapters (MAC address), languages (IETF language tag, ISO 639) and the list goes on and on. For instance, from the above list Universally Unique Identifiers (UUIDs) and Globally Unique Identifiers (GUIDs) are used to globally uniquely identify software entities. However, there is no such identifier exist for people. As mentioned earlier, the Social Security Number (SSN) in the United States and various Identification Numbers in other countries have jurisdiction only in that given country or limited geographical area. They definitely do not have a global reach as suggested in this invention. To clarify this difference one just need to remember, for instance, that Social Security Numbers can only be issued to U.S. citizens, permanent residents, and temporary (working) residents under section 205(c)(2) of the Social Security Act within the United States. In addition, it has also been pointed out in the prior art that SSNs are neither universal nor unique. In contrast, our proposed Universal Identifier is globally unique to every individual on earth who enrolls in the system.

In addition, current identifiers are not only limited geographically, they are also limited in scope. In many countries it is regulated by law what kind of authentication scenarios or transactions can a certain identifier be used for or what can it be requested for. In many cases different identifiers are used when crossing borders, with law enforcement, applying for a job or proving identity at financial transactions. Also, in general there are very few identifiers capable of completing a financial transaction on their own. That is, in most countries an ID card or a driver license alone is not enough to pay for goods and services. The intended purpose of our Universal Identifier is to be used in any and all types of transaction, process or scenario where authentication is needed. When bound to its owner's financial data it could also alleviate the user from having to pay for financial transactions with cash, credit or debit card or check. In other words with the Universal Identifier there is no wallet needed to conclude financial transactions.

UIDs are issued by an Identity Clearinghouse (IC) or a Universal Authentication Authority (UAA) or a Centralized Identity Management Service (CIMS) to give some potential names. Enrollment in such a system is voluntary except when requested by certain employers or enforced by law enforcement. A crucial element of the registration/enrollment process is the submission of the applicant's biometric data. Since a crucial biometric, the iris, stabilizes just before a child's $1^{st}$ birthday, the earliest date one could apply for a child's UID could be after the child's first birthday. Without the submission of unique biometric and personal data there could be no UID issued for the applicant. Consequently, as mentioned earlier, the UID would be used in conjunction with biometric authentication.

There have been other universal authentication methods proposed—for example in U.S. Pat. No. 7,188,360 (2007) to Gerdes et al. However, their method is lacking to utilize any biometric data. Other methods propose to use biometric data in their authentication scheme such as in U.S. patent 2008/0065895 to Liu et al. and U.S. patent 2007/0094509 to Wei et al. There are also many proposals for a biometric authentication device such as in U.S. patent 2007/0260887 to Ito. Although these proposals are based on using biometrics for authentication they fail to include a globally unique universal identifier when describing their authentication method. That universal identifier is essential in our proposed system and method since this is what allows it to operate on a global scale and in any type of electronic transaction or service where authentication is needed. Some proposals describe a universal card—as in U.S. Pat. No. 6,715,679 B1 (2004) to Infosino, or an authentication card—as in U.S. patent 2007/0215693 to M'Raihi for authentication. However, the number on these cards refers to the card itself and not to the owner of the card. It is important to note that our proposed Universal Identifier refers to the person itself. At the same time it is also important to note that in our proposed authentication method the role of the Universal Identifier is limited to the role of an index number or index symbol sequence. By itself the Universal Identifier cannot authenticate a person. It is only to be used in biometric authentication whereby the Universal Identifier helps to find a user's stored biometric data in the database for performing the matching.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF THE EMBODIMENTS

Figure 1:
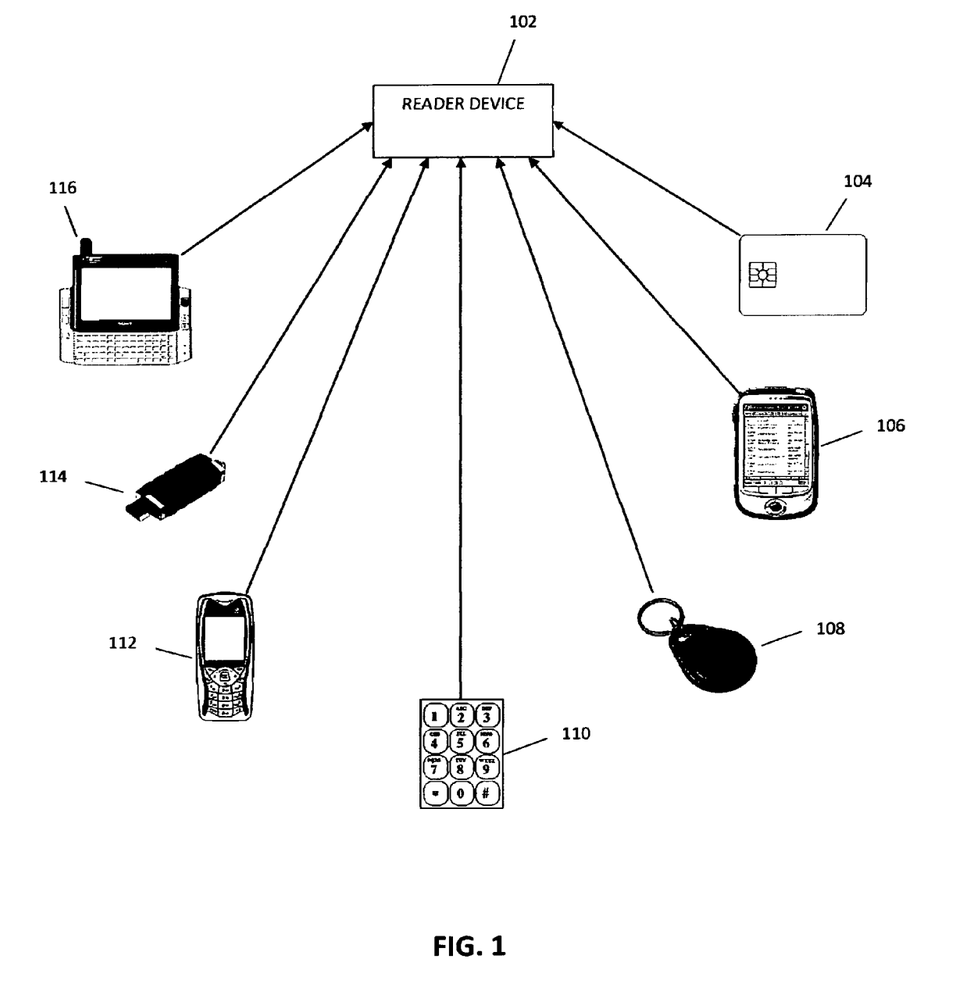
FIG. 1 is a block diagram illustrating the use of UIDs for authentication by a reader device.

Referring to FIG. 1, a use of Universal Identifiers for authentication by a reader device according to an embodiment of the present invention is illustrated. The global, universal and worldwide nature of the authentication system derives from the fact that each person using the system anywhere on earth can have only one unique identifier called the Universal Identifier or UID. A key constituent of the invention is a generic reader device 102 that is able read UIDs from at least one or a plurality of host devices 104-116. Said reader device also contains a local database or list of UIDs with binding biometric and/or personal data for being able to execute authentication. As a way of illustration and not as a limitation said reader device might contain a Radio Frequency Identification (RFID) reader which would collect UIDs from embedded RFID tags or transponders. Said RFID tag could be embedded in a variety of magnetic cards, smart cards, proximity and/or vicinity cards 104. In terms of reading methodology these cards could be swipe ones, contact or contactless cards. Since a UID consists of only a handful of bytes of data most plastic cards in existence today would be able to store that amount of information. Aforementioned RFID tag could also be embedded in a Personal Digital Assistant (PDA) 106 or in a keychain fob 108. The user could also enter his/her UID by typing it in on a keypad 110 attached or connected to the reader device. By way of illustration and not as limitation other potential host device for the RFID tag is the cell or mobile phone including smart phones 112, the USB flash drive along with other dongle devices 114, and the Ultra Mobile Personal Computer (UMPC) or micro PC 116 in another terminology. The above list of host devices for RFID tags 104, 106, 108, 110, 114, and 116 are only mentioned for illustrative purposes and purely for the purposes of description and should not be regarded as limiting. There are potentially many other devices that could host a tag with UID information encoded in them. There could also be some other ways to transmit UID data to an authenticating reader device. In addition, according to the above embodiment of the invention the UID is being read from RFID tags embedded in a plurality of host devices and nothing is being written back to the tag itself. In other words beyond establishing connections between the reader device and various RFID tag host devices there is only a one way communication. In another embodiment of the invention two-way communication is also possible whereby data might be written back from the reader device to the RFID tag itself. In yet another embodiment of the invention there is no database or list of UIDs maintained on the said reader device, but instead some other biometric or other identifying data is also collected by the reader device simultaneously with reading the UID.

Figure 2:
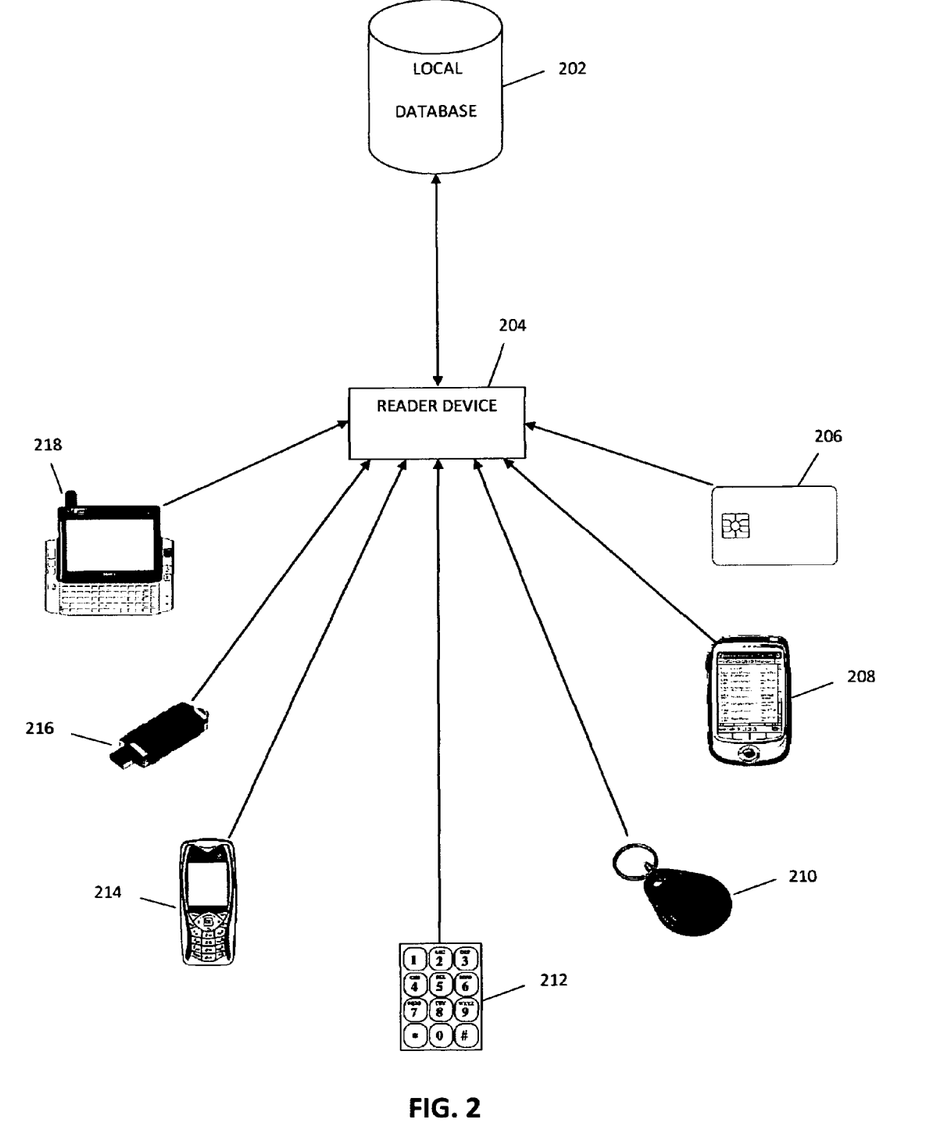
FIG. 2 is a block diagram illustrating the use of UIDs for authentication by a reader device in connection to a local database.

Referring to FIG. 2, a use of Universal Identifiers for authentication by a reader device in connection to a local database according to an embodiment of the present invention is illustrated. In this embodiment of the invention a local database of UIDs is maintained along with accompanying biometric and/or personal data of users 202. Said local database is connected to at least one or a plurality of reader devices 204 that are able read UIDs from at least one or a plurality of host devices 206-218. The read UIDs are passed along from the reader device to the local database for performing the authentication. The stored biometric and/or other data of a person are found in the local database by using her/his UID as the key.

Figure 3:
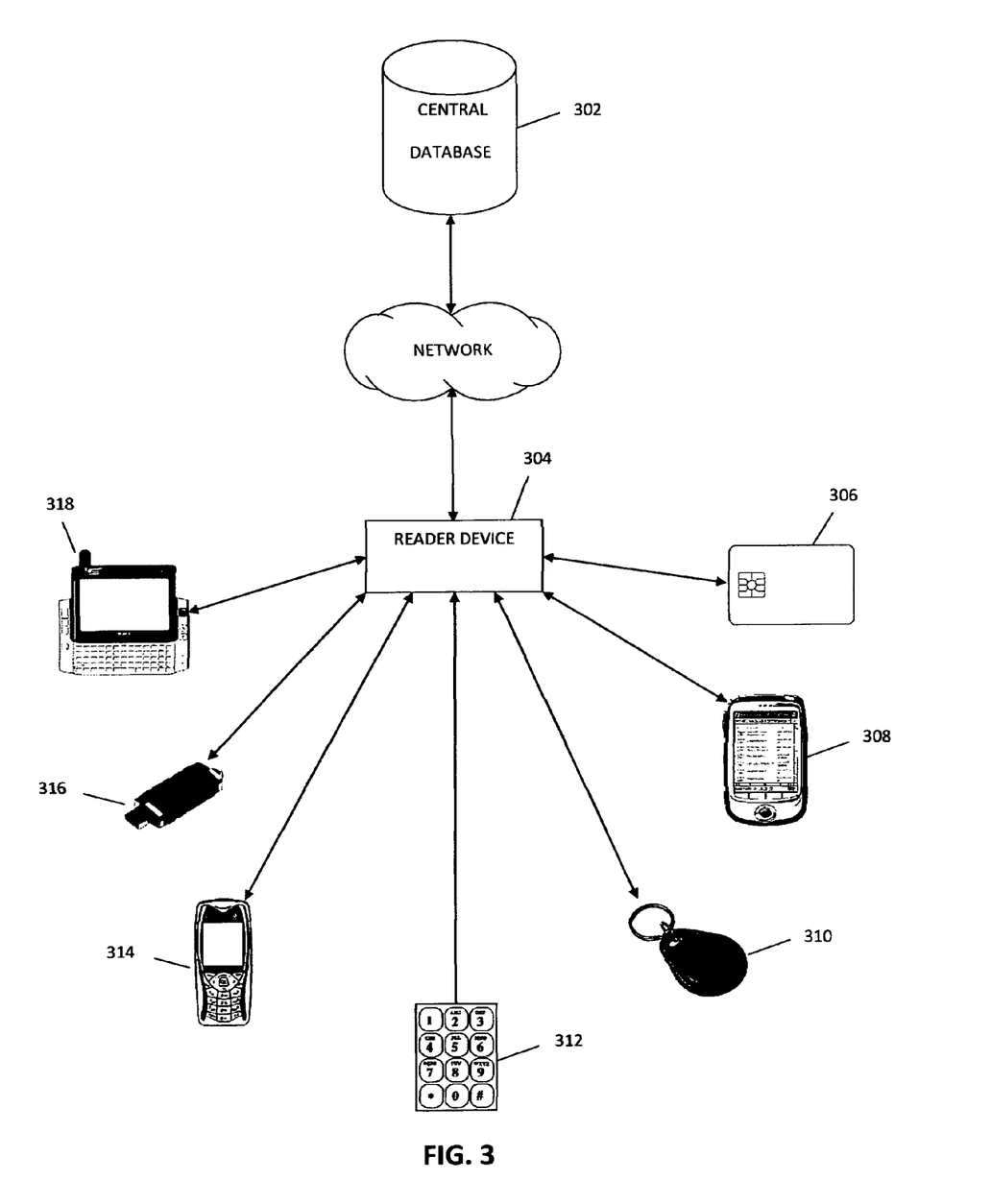
FIG. 3 is a block diagram illustrating the use of UIDs for authentication by a reader device in connection to the central database.

Referring to FIG. 3, a use of Universal Identifiers for authentication by a reader device which is directly connected to the central database according to an embodiment of the present invention is illustrated. In this embodiment of the invention the central database 302 which contains all the user information such as all the UIDs with accompanying biometric and/or personal data of users is directly connected to a reader device 304 via a network connection. The said connection could be any kind of wired or wireless internet or any other connection. Said reader device 304 is able read UIDs from at least one or a plurality of host devices 306-318. The read UIDs are passed along from the reader device to the central database for performing the authentication. The stored biometric and/or other data of a person are found in the central database by using her/his UID as the key.

FIGS. 1-3 above illustrated various host devices in which Universal Identifiers could be embedded: cards, mobile phones, PDAs, key chains, USB flash drives, UMPCs just to name a few. These figures also featured the key pad as an additional means to enter UID data. The difference between FIGS. 1-3 was whether the read or entered UIDs stayed on the local reader device FIG. 1, they were passed along to the local database FIG. 2, or they were directly transferred to the central database via a network connection FIG. 3.

Figure 4:
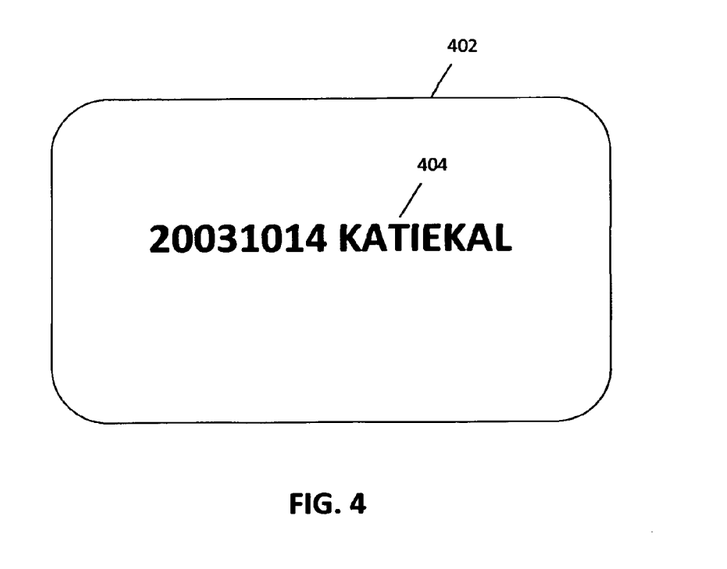
FIG. 4 is a diagram of an embodiment of the Universal Identifier.

Referring to FIG. 4, a Universal Identifier card according to an embodiment of the present invention is illustrated. Such a card might be issued to someone who requires it after enrollment. In one embodiment the card could be a plastic card in the shape of a credit card 402 or any other shape that fits into most wallets. In other embodiments the card could be fabricated out of metal, cardboard, paper or any other suitable material. At minimum the Universal Identifier associated with the user is printed on the card 404. In various embodiments of the invention other personal information about the user together with other administrative information may also be included on the card. As a way of illustration and not as a limitation such information could be: name of user, gender, current address, color of eye, color of hair, picture of the user, date of birth, place of birth, date of issue, place of issue just to name a few.

In the following various characteristics and details of the Universal Identifier, as a code scheme will be discussed. The main characteristic of the UID is that it uniquely identifies every individual in the world who had registered with the system. The development of the iris, one of the most important biometric used in conjunction with the UID, only finalizes about 10 months after birth. Accordingly, the UID might be obtained after one's $1^{st}$ birthday. However, in other embodiments of the invention other minimum age requirement can also be set. The UID can be any sequence of symbols, such as numerals or letters or both or even other characters, which can produce at least as large or larger unique combinations than the entire current and expected human population. The world's current population is at 6.6 billion and it is not expected to exceed around 10 billion in the foreseeable future. With that in mind we set the requirement that the symbol sequence scheme to be used as Universal Identifier should be able to produce at least 10 billion unique combinations.

Figure 8:
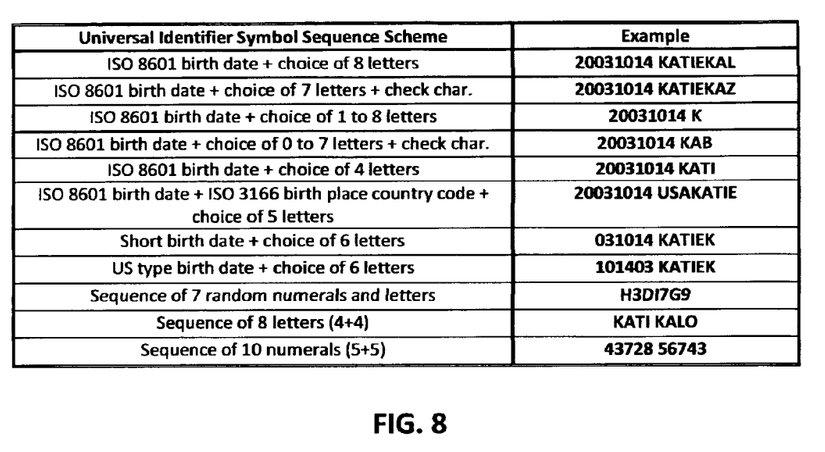
FIG. 8 shows several examples of symbol sequence schemes for the Universal Identifier along with their brief descriptions.

There are many potential symbol sequence schemes that would satisfy the above requirement. In what follows, as a way of illustration and not as limitation, several of these potential code schemes will be discussed. For a summary of some of these potential symbol sequence schemes for Universal Identifiers pelase refer to FIG. 8. Additional secondary requirements for a symbol/character scheme to be used as a Universal Identifier are:

easy to remember by user
  embedded in itself might use other identifying information (such as birth date, gender)

As an example, using the birth date of the user in his/her identifier is both easy to remember and it also exposes some other identifying information. The representation of date of birth might follow ISO 8601 the international standard for date and time representations. According to the ISO 8601 standard information is ordered from the most to the least significant. For example someone being born on Oct. 14, 2003 would be represented as "20031014".

Figure 5:
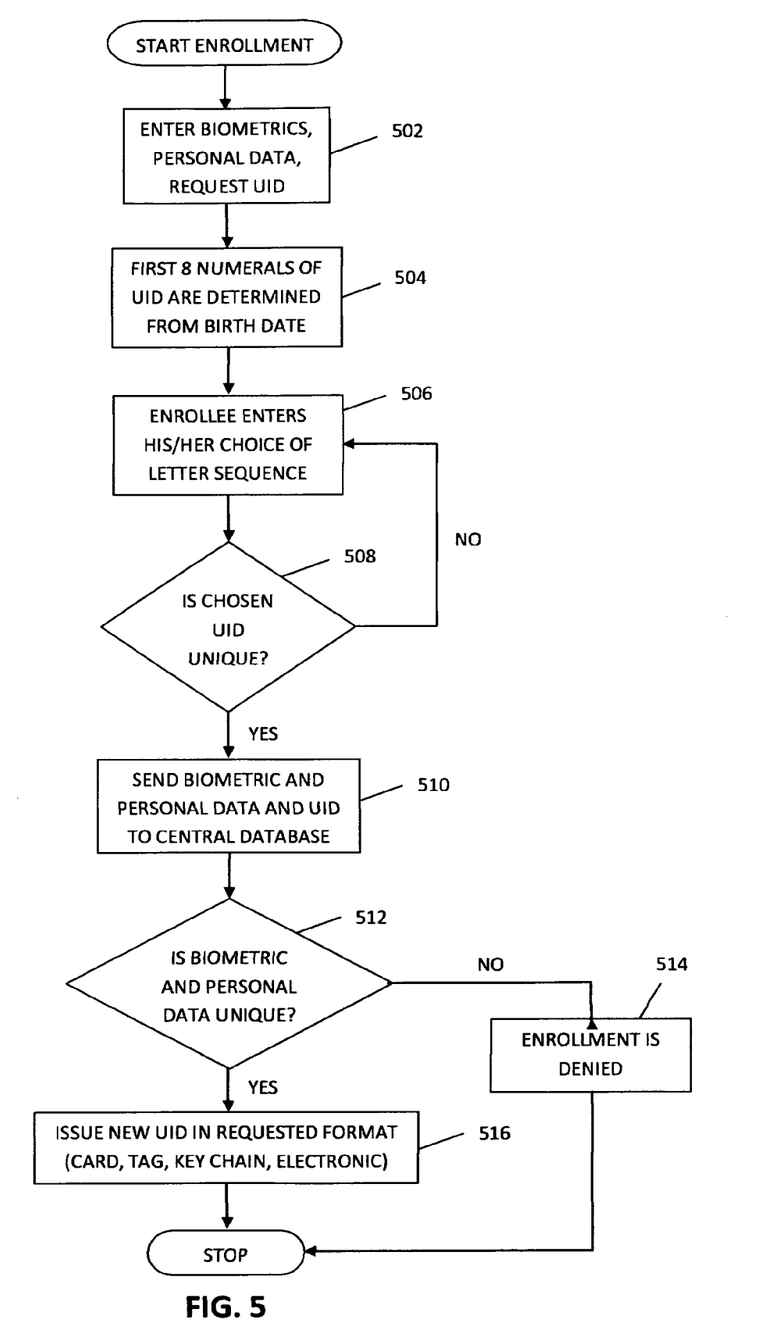
FIG. 5 is a flow diagram of an enrollment process to the authentication service.

Of course, nowadays there are about 300,000 babies being born every day, so the birth date alone would not be able to satisfy the sufficient combination requirement. Something else beyond the date is needed. As a way of illustration and not as limitation the 8 digit birth date could be followed by 1 to 8 letter symbols chosen by the user. This letter sequence would preferably be something related to the name of the user. As will be shown on FIG. 5 the central database would automatically check the availability of letter sequences paired with a given birth date. If a name is already taken, then the user will be prompted to enter a new one until an available letter combination is found. Once an unregistered number and letter combination is found that temporary UID is issued to the user. Further verification of biometric and personal data will make that UID a permanent one. Once a UID is issued to a person it cannot be issued to anyone else. As an example a UID might look like this:

20031014 KATIEKAL

Hence the above UID is comprised of 8 numerals given by the person's birthday and 8 letters chosen by the user. In another embodiment of the invention the user might only choose 7 letters and the $8^{th}$ letter would be calculated from the previous numerals and letters as a check character. This check character would perform a form of redundancy check and be used for error detection. Essentially, it would confirm that the given Universal Identifier is potentially a valid one. There could be many ways to calculate the check character based on various checksum, longitudinal redundancy check (LRC) or horizontal redundancy check (HRC) algorithms just to name a few. The previous example with a check character as the last one might look like this:

20031014 KATIEKAZ

In another embodiment of the invention following his/her birth date the user might choose any number of letters between 1 and 8. In the example below the user only chose one letter after her/his birthday:

20031014 K

In another embodiment of the invention following his/her birth date the user might choose any number of letters between 0 and 7. After that choice the check character would be calculated and added to the sequence. In the example below the user chose 2 letters and after those the calculated check character is added to the sequence hence producing 3 letters after the birth date:

20031014 KAB

In other embodiments of the present invention users could choose a maximum of 4, 5, 6 or 7 letters after their birth date. They could even choose more than 8 letters. The 4 maximum number of letters is mentioned earlier because in the English alphabet 4 letters would provide a combination of close to half a million which would already potentially cover the approximately 300,000 babies being born every day. The combination produced by only 3 letters or less would be insufficient for that. For an example of UID with maximum 4 letters after the birth date please consider:

20031014 KATI

However, to give users more flexibility in choosing letter sequences of their liking, up to a higher number of letters might be used, such as 7 or 8 letters or even a higher number. Although, as described above, 4 letter combinations would already cover the entire population. In another embodiment of the invention after the ISO 8601 birth date the ISO 3166 country code for the birth place might also be included followed by the user's choice of the 5 remaining characters. As an example for someone born in the USA the UID might contain:

20031014 USAKATIE

Naturally, in another embodiment the 2 letter country code might also be used. In a different embodiment the latitude and longitude of the birth place could also be encoded in the identifier. In yet another embodiment of the invention a short version of the birth date might be used. Instead of four, two numerals for the year might be used in the birth date followed by 6 user chosen letters just like this:

031014 KATIEK

Other organization of the year, month and day of the birth date is also possible, for instance, according to United States standards the above date would look like:

101403 KATIEK

Of course, just as before in other embodiments different number of chosen letters might be employed along with including the check character discussed earlier. However, the birth date does not necessarily need to be included in the Universal Identifier. Instead, just as for license plates, a random sequence of numerals and letter would also suffice. Again, to potentially cover up to 10 billion people at least 7 characters would need to be used as below:

H3DI7G9

Notice, that in all the above examples to Universal Identifier mixed numerals and letters according to certain rules. However, in another embodiment only letters might also be used. In the example below 8 letters in two groups of 4 comprise the identifier:

KATI KALO

Using 8 letters would be the minimum to potentially cover at least 10 billion people, but in other embodiments more than 8 letters could easily be used. On the other hand instead of letters only numerals might also be employed. The example below shows an identifier with 10 numerals in two groups of 5:

43728 56743

Again, to cover at least 10 billion people at minimum 10 numerals would be needed. Similarly to letters more than 10 digits might easily be used as well.

In the above discussion as a way of illustration and certainly not as a limitation various symbol schemes for the Universal Identifier were described. However, there are obviously many other ways to produce a symbol sequence scheme with the combinatorial power of at least 10 billion. Even mixing and matching elements from the above discussed schemes would provide a lot more types of identifier variations. All the above identifier schemes used the Arabic numerals from 0 to 9 and/or the English alphabet. When allowing for other symbols to be present the number of embodiments for identifier schemes yet again increases dramatically.

Beyond these variations in the symbol sequence scheme the Universal Identifier could also have numerous embodiments with regards to its physical appearance. FIG. 4 discussed the Universal Identifier Card. However, in other embodiments the UID could be loaded into an electronic tag which itself could be embedded in a mobile phone, personal digital assistant, universal mobile personal computer, keychain fob, universal serial bus flash drive, smart card or many other device. In yet another embodiment the UID could also only exist in the memory of the user and without any physical presence. In this case the user would enter the UID on a keypad or by any other means when needed.

Referring to FIG. 5, an enrollment process according to an embodiment of the present invention is illustrated. To start the enrollment process the enrollee submits his/her biometric data along with personal information and requests a UID 502. According to a preferred UID scheme the first 8 numerals of the UID are determined from the birth date of the user and added according to ISO 8601 the international standard for date and time representations 504. After this the enrollee is prompted to enter his/her choice of letter sequence from the English alphabet to complete the UID 506. This letter sequence would typically be something related to the name of the applicant. At this point it is checked in the central database whether the birth date and the chosen letter sequence combination is unique 508. If it is not unique then the user is asked to enter another letter sequence. This request is repeated until the enrollee enters a unique letter combination for the given birth date. Once it is established that the chosen UID is unique then the applicant's biometric and personal data along with the chosen UID is sent to the central database 510. Next, the uniqueness of the submitted biometric and personal data is verified in the central database 512. This process is an important part of making sure that there is only one pair of biometric and personal biographic data exist in the database for every enrolled individual. If either the biometric or the personal data is not unique then enrollment in the database is denied and the UID is not issued 514. When this happens the enrollee still has an opportunity to plea his/her case as to why registration should be granted. If both the biometric and personal data are found to be unique then registration is completed and a new UID is issued to the enrollee in the requested format 416. The user could ask for a UID card, keychain, or for the UID to be uploaded into the RFID tag embedded in his electronic device (mobile phone, PDA, UMPC and such).

Figure 6:
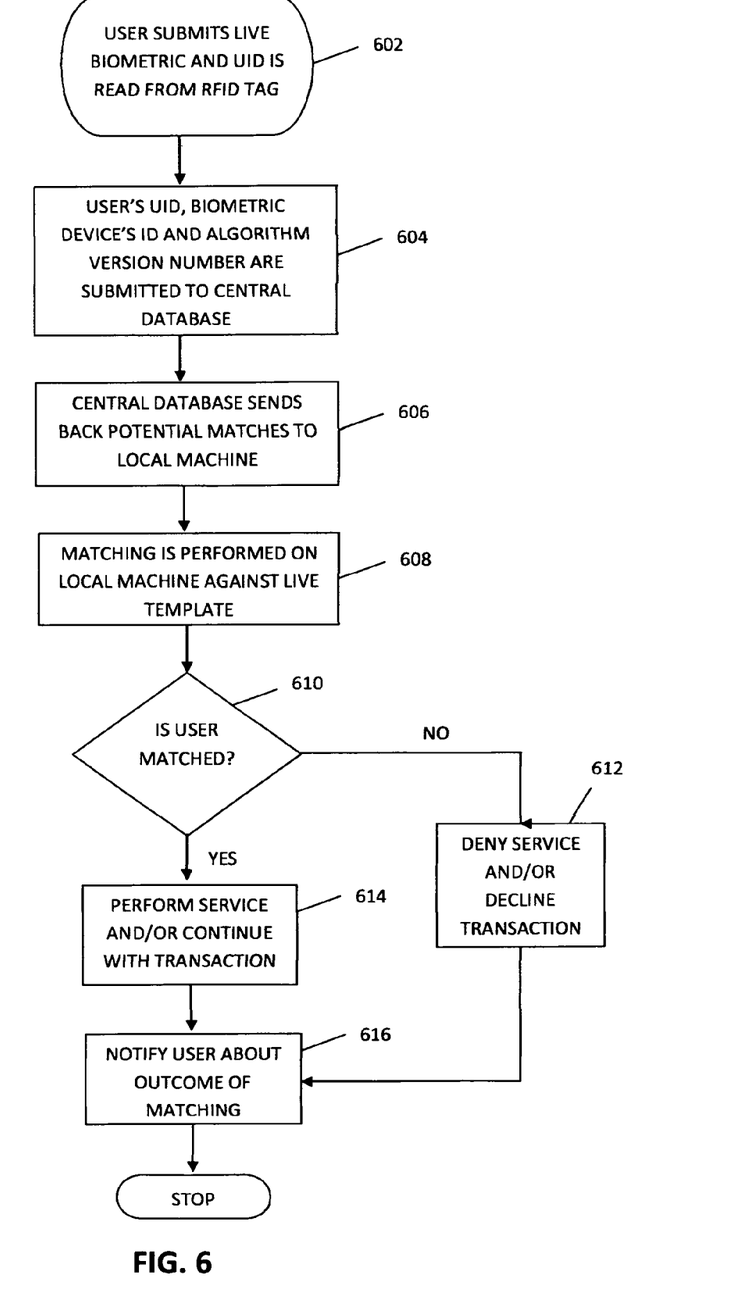
FIG. 6 is a flow diagram of using the UID for authentication in a transaction and/or service request with matching performed on the local device.

Referring to FIG. 6, a flowchart of using the UID for authentication in a transaction and/or service request according to an embodiment of the present invention is illustrated. The process starts with the user, who is already enrolled in the central database, submitting his/her biometric data at a biometric reader 602. Said reader is also used to acquire the user's Universal Identifier (UID) from a Radio Frequency Identification (RFID) tag which the user presents 602. By way of illustration and not as a limitation the RFID tag could be a contactless or contact based smart card, a swipe card, a vicinity or proximity card, a tag on a keychain, a tag embedded in a mobile phone or a tag embedded in any other device with the ability to store a UID. In an alternate embodiment of the invention the user's UID can be hand keyed or entered by another means. The user's UID and the biometric reader device's ID (which is, of course, not a universal identifier to the present authentication system) along with the algorithm version number are submitted to the central database 604. In another embodiment of the invention the algorithm version number could be broken into two parts: one for the matching algorithm and one for the biometric template creating algorithm. These three types of information: UID, device ID and algorithm version number are needed by the central database to know which biometric templates to look up for potential matching. One user could be enrolled with many different devices each running various versions of algorithms. In order to assure that the potential best match is made the central database would look up the stored biometric data (template or templates) for which the circumstances of creation are closest to the current live acquisition. Once the best potential stored template or a plurality of templates is identified, based on the UID, device ID and algorithm version number, then these are sent back to the local machine 606. Then matching between the returned stored template or templates and the live just acquired template is performed on the local machine 608. Based on a predetermined criterion, a preset matching threshold, it is decided whether a match has been found 610. If there was no match found then the requested service is denied and/or the started transaction is declined 612. If a match was found then the requested service is performed and/or the transaction is completed 614. In either case the user is notified about the outcome of the matching process 616. In case of a false negative outcome the user can repeat the biometric data acquisition process or can contact the central database to resolve the problem. In another embodiment of the invention if the user is a wanted person then the appropriate local law enforcement agency is notified about the initiated transaction or service request. In yet another embodiment of the invention the picture of the user, who initiated the transaction/service request, is displayed on the local machine for the cashier/clerk/receptionist/administrator to review. This picture of the user is uploaded to the local machine from either the RFID tag presented by the user or it is returned from the central database along with the potential matches.

Figure 7:
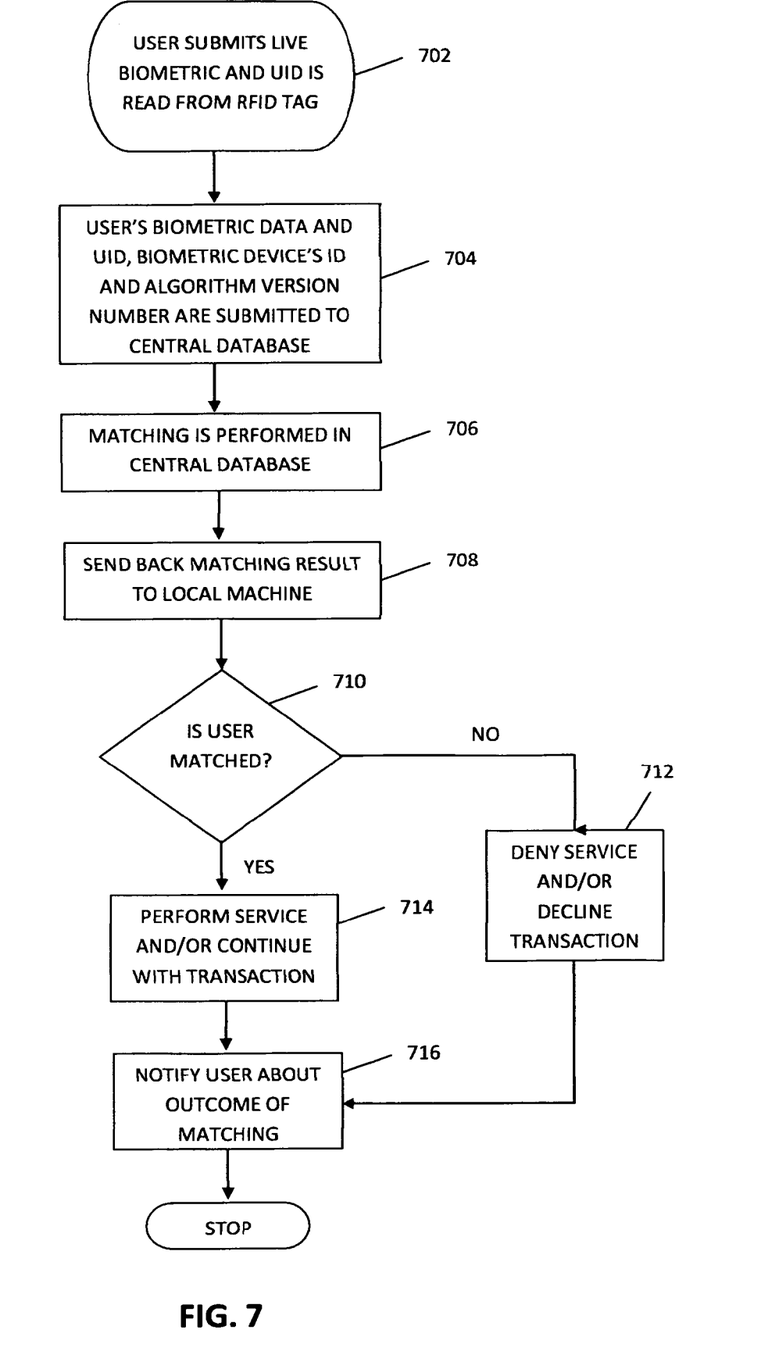
FIG. 7 is a flow diagram of using the UID for authentication in transaction and/or service request with matching performed on the central server.

Referring to FIG. 7, a flowchart of using the UID for authentication in a transaction and/or service request with matching performed on the central server is illustrated according to an embodiment of the present invention. First the user's live biometric data is collected with a biometric reader and her/his UID is read from an RFID tag 702. Then the user's live biometric data, his/her UID, the biometric reader device's ID and the used algorithm's version number are submitted to the central database 704. Just as mentioned above the version number could have two parts one for the matching algorithm and one for template creation. Based on the user's UID, the biometric device's ID and the algorithm version number(s) the best potential stored templates are located in the central database for matching. Next, matching is performed between the live, just acquired and transmitted template and the best stored template(s) to find out if there is a match 706. The matching result is then sent back to the local machine 708. Based on a predetermined matching threshold, it is decided whether a match has been found 710. If there was no match found then the requested service is denied and/or the started transaction is declined 712. If a match was found then the requested service is performed and/or the transaction is completed 714. In both cases the user is notified about the outcome of the matching process 716. In case of a false negative outcome the user can repeat the biometric data acquisition process or can contact the central database to resolve the problem.

CONCLUSION, RAMIFICATIONS, AND SCOPE

As alluded to earlier, the Universal Identifier is universal from two different aspects. First, it is a global or worldwide identifier meaning that an individual can uniquely identify herself/himself with it all around the world. Second, it is universal because an individual can use this identifier in all possible authentication scenarios. Whether dealing with a government agency, traveling abroad, conducting a financial transaction, dealing with the healthcare system or an educational institution or using it at the workplace to name a few potential scenarios, by way of illustration and not as a limitation, the same Universal Identifier can be called upon. In functionality the proposed UID is probably most similar to the Social Security Number (SSN) within the United States. Just as the SSN the UID would also be used broadly for many different types of situations where the verification of identity is needed. However, there are several key differences between the SSN, other identifiers and the UID:

1. There is no need to protect the UID
2. The UID cannot be lost or stolen
3. As its name states the UID is a universal/global/worldwide/borderless identifier
4. The UID can be used universally in any authentication scenario In more detail:

1. Due to the current epidemic proportions of identity theft citizens in many countries are constantly reminded to protect and hide their identity and personal information. In the United States this translates to individuals being asked to keep their SSN a secret as much as possible. With the UID this is no longer necessary. This is due to the fact that a person's UID is tied to his/her biometric data. The UID is worth nothing without the user being able to submit matching live biometric sample(s) at the time of authentication.
2. Most currently used identifiers are printed on some type of identity card or on some other identifying document. As a consequence that card or document can be lost or stolen. The UID is not tied to any kind of card or document only to biometric data. Since someone's biometric cannot be lost or stolen the UID also cannot be lost or stolen.
3. There is no global/worldwide identifier exists currently. The proposed UID is by definition a global/universal identifier.
4. All currently available identifiers are limited in their scope. They work in certain situations requiring authentication, but they do not work in some others. The UID is designed to be used in all authentication scenarios without an exception.

The words global, worldwide and universal are used interchangeably in this document. Also, it is to be understood that the terminology and phraseology employed herein are for illustrative purposes and purely for the purposes of description and should not be regarded as limiting.

It is not the purpose of the present invention to discuss or contemplate how biometric and personal data, and electronic or other credentials of a person are being bind to his/her Universal Identifier. The present invention only describes various embodiments of the authentication method using the Universal Identifier, an identifier that uniquely identifies an individual anywhere on the planet.

What is claimed is:

1. A method for authenticating a user in an authentication system, the authentication system having a central database that has stored therein unique biometric, unique personal biographic and universal identifier data of all the users, and at least one local biometric reader device is configured to access the database, wherein the following steps are performed:
   (i) reading, the user's live biometric data and his or her universal identifier via the local biometric reader device;
   (ii) transmitting, the user's universal identifier from the biometric reader device to a central database of the authentication system;
   (iii) transmitting, back potential matching biometric data from said central database to the local biometric reader device based on said universal identifier;
   (iv) performing, on the local device matching of the live biometric data collected at the local biometric device against the stored biometric data received back from the central database;
   (v) performing, service or transaction if the match result is above a predetermined threshold, otherwise denying service or declining transaction;
   (vi) notifying, user about the outcome of the matching process.

2. The authentication method of claim 1, wherein said universal identifier is comprised of 8 numerals indicating a user's birth date and 8 letters chosen by the user.

3. The authentication method of claim 1, wherein said universal identifier is comprised of 8 numerals indicating a user's birth date and 7 letters chosen by the user and an $8^{th}$ check character which is calculated from the previous numerals and letters.

4. The authentication method of claim 1, wherein said universal identifier is comprised of 8 numerals indicating a user's birth date and any number of letters between 1 and 8 chosen by the user.

5. The authentication method of claim 1, wherein said universal identifier is comprised of 8 numerals indicating a user's birth date and any number of letters between 0 and 7 chosen by the user and a check character which is calculated from all the previous characters.

6. The authentication method of claim 1, wherein said universal identifier is comprised of 8 numerals indicating a user's birth date and a maximum of 4, 5, 6, or 7 letters chosen by the user.

7. The authentication method of claim 1, wherein said universal identifier is comprised of 8 numerals indicating a user's birth date and 3 letters indicating the country code for the user's birth place and 5 letters chosen by the user.

8. The authentication method of claim 1, wherein said universal identifier is comprised of 6 numerals indicating the short version of a user's birth date and 6 letters chosen by the user.

9. The authentication method of claim 1, wherein said universal identifier is comprised of a sequence of 7 numerals and/or letters chosen by the user.

10. The authentication method of claim 1, wherein said universal identifier is comprised of 8 letters in two groups of 4 chosen by the user.

11. The authentication method of claim 1, wherein said universal identifier is comprised of 10 numerals in two groups of 5 chosen by the user.

12. The authentication method of claim 1, wherein said biometric reader device's identifier or model number is also transmitted from the biometric reader device to the central database to help achieve a better match.

13. The authentication method of claim 1, wherein said biometric reader device's biometric algorithm version number is also transmitted from the biometric reader device to the central database to help achieve a better match.

14. The authentication method of claim 1, wherein said universal identifier is read from an RFID tag that is embedded in a magnetic card, or a smart card, or a proximity card, or a vicinity card, or a personal digital assistant, or a keychain fob, or a or a mobile phone, or a usb flash drive, or in an ultra mobile personal computer.

15. The authentication method of claim 1, wherein said universal identifier is entered via a keypad.

16. The authentication method of claim 1, wherein the user's captured live biometric data is also transmitted back to the central database along with the user's universal identifier and matching is performed on the central database.

17. The authentication method of claim 1, wherein the database that the biometric reader device is connected to is a local database.

18. A method for enrolling a user into an authentication system, the authentication system having a central database that has stored therein biometric, personal biographic and universal identifier data of the users, and at least one enrollment station configured to access the database, wherein the following steps are performed:
  (i) entering, the user his or her biometric and personal biographic data and requesting a universal identifier at the enrollment station;
  (ii) determining the first 8 numerals of the universal identifier from the birth date of the user;
  (iii) entering, the user his or her choice of letter sequence for the rest of the universal identifier;
  (iv) determining, at the central database whether the completed universal identifier is unique;
  (v) in the event that the chosen universal identifier is not unique, entering, the user new choice of letter sequence until a unique universal identifier is found;
  (vi) sending, the biometric, personal biographic and universal identifier data to the central database;
  (vii) determining, whether the submitted biometric and personal biographic data is unique;
  (viii) issuing, the universal identifier if the submitted biometric and personal biographic data was unique;
  (ix) denying, issuance of the universal identifier if either the biometric or the personal biographic data was not unique.

19. The method for enrolling a user into an authentication system of claim 18 wherein the uniqueness of the requested new universal identifier is determined at the enrollment station.

* * * * *